(12) United States Patent
Shim et al.

(10) Patent No.: US 10,574,803 B2
(45) Date of Patent: Feb. 25, 2020

(54) MOBILE TERMINAL

(71) Applicant: LG Electronics Inc., Seoul (KR)

(72) Inventors: Janghwan Shim, Seoul (KR); Donghan Kang, Seoul (KR); Taehwan Jeon, Seoul (KR); Byungkil Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/900,056

(22) Filed: Feb. 20, 2018

(65) Prior Publication Data

US 2019/0052741 A1 Feb. 14, 2019

(30) Foreign Application Priority Data

Aug. 10, 2017 (KR) .................. 10-2017-0101564

(51) Int. Cl.
| | | |
|---|---|---|
| *H04B 1/03* | (2006.01) | |
| *H04B 1/08* | (2006.01) | |
| *H04M 1/03* | (2006.01) | |
| *H04M 1/18* | (2006.01) | |
| *H04M 1/725* | (2006.01) | |

(52) U.S. Cl.
CPC ............ *H04M 1/185* (2013.01); *H04M 1/03* (2013.01); *H04M 1/72569* (2013.01); *H04M 1/72583* (2013.01)

(58) Field of Classification Search
CPC .... H04M 1/185; H04M 1/03; H04M 1/72569; H04M 1/72583; H04B 1/03; H04B 1/08; H04B 5/0006
See application file for complete search history.

(56) References Cited

U.S. PATENT DOCUMENTS

| | | | |
|---|---|---|---|
| 9,686,879 B2* | 6/2017 | Takahashi | ............ H05K 5/062 |
| 2009/0176534 A1* | 7/2009 | Lee | ........................ G06F 3/016 |
| | | | 455/566 |
| 2013/0082970 A1 | 4/2013 | Frey et al. | |
| 2014/0189528 A1* | 7/2014 | Chang, II | ............ H04M 1/6075 |
| | | | 715/752 |
| 2015/0119109 A1 | 4/2015 | Sudo et al. | |
| 2015/0181338 A1* | 6/2015 | Hosoi | .................... H04R 5/033 |
| | | | 381/309 |
| 2017/0045915 A1 | 2/2017 | Pope et al. | |
| 2017/0105294 A1 | 4/2017 | Shimoda et al. | |
| 2017/0126872 A1* | 5/2017 | Cha | ................. H04M 1/274508 |

(Continued)

FOREIGN PATENT DOCUMENTS

| | | |
|---|---|---|
| EP | 2800395 | 11/2014 |
| EP | 2806654 | 11/2014 |
| WO | WO2014003148 | 1/2014 |

OTHER PUBLICATIONS

European Search Report in European Application No. 18156020.2, dated Jul. 20, 2018, 14 pages.

*Primary Examiner* — Andrew Wendell
(74) *Attorney, Agent, or Firm* — Fish & Richardson P.C.

(57) ABSTRACT

There is disclosed a mobile terminal comprising a body; a display unit disposed on a front surface of the body and having elasticity; a vibration receiver attached to a rear surface of the display unit; a speaker having a higher output than the vibration receiver and configured to transmit sound to a distant location; and a controller configured to vibrate the display unit by driving the vibration receiver according to an audio signal.

18 Claims, 13 Drawing Sheets

(56) References Cited

U.S. PATENT DOCUMENTS

2017/0151484 A1* 6/2017 Reilly .............. A63B 71/0622
2017/0192065 A1   7/2017 Lee et al.
2017/0255442 A1* 9/2017 Kim .................. G06F 3/04883
2017/0322621 A1* 11/2017 Ueda ..................... H04M 1/00
2018/0268783 A1* 9/2018 Woo ..................... G09G 5/373

* cited by examiner

US 10,574,803 B2

MOBILE TERMINAL

CROSS-REFERENCE TO RELATED APPLICATIONS

This application claims priority to Korean Patent Application No. 10-2017-0101564 filed on Aug. 10, 2017 in Korea, the entire contents of which is hereby incorporated by reference in its entirety.

TECHNICAL FIELD

Implementations of the present disclosure relate to a mobile terminal having a large screen, with a minimized bezel and no receiver hole formed in a front surface.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

By extension, such functions may become more improved with an expanded range of mobile terminal usage. There are efforts under way to minimize the size of the components loaded in a front surface so as to provide a large screen while minimizing the size of the mobile terminal. A receiver located in the front surface or a home button located in an upper or lower side of a display so as to limit the size of the screen. Accordingly, there are needs for a mobile terminal having no receiver or home button provided in the front surface.

Moreover, there are needs for a mobile terminal having a waterproof structure configured to protect internal components even in environments with water, for example, in a waterpark or bathtub where a user uses the mobile terminal. To enhance a waterproof function, the number of the holes formed in a case needs to be minimized. In other words, the receiver or home button has to be removed or minimized for the waterproof function.

SUMMARY

Accordingly, an object of the present invention is to address the above-noted and other problems.

An object of the present disclosure is to a mobile terminal including a vibration receiver configured to transmit sounds via vibration of a display unit so as to enhance a waterproof function and enlarge a display unit of a front surface as much as possible, instead of a dynamic receiver configured to transmit sounds via air.

Implementations of the present disclosure may provide a mobile terminal including: A mobile terminal comprising a body; a display unit disposed on a front surface of the body and having elasticity; a vibration receiver attached to a rear surface of the display unit; a speaker having a higher output than the vibration receiver and configured to transmit sound to a distant location; and a controller configured to vibrate the display unit by driving the vibration receiver according to an audio signal.

The controller may drive only the speaker, when sensing a crack generated on the display unit or a window disposed on a front surface of the display unit.

The window may comprise a touch sensor, and the controller may determine an error of the touch sensor as the crack of the window.

The display unit may further comprise a proximity sensor, and the controller may drive only the vibration receiver, when the proximity sensor senses that the user approaches, and the controller may drive the vibration receiver and the speaker simultaneously, unless the proximity sensor senses that the user approaches.

The plurality of the vibration receivers may be provided, and the controller may provide a stereo sound by driving the plurality of the vibration receivers based on different channel audio signals, respectively.

The mobile terminal may further comprise a memory in which a different equalizer value for each one of points of the display unit is stored, wherein the controller may set one of the points as an output point and drive the vibration receiver based on the equalizer value of the output point.

The e controller outputs a call button for connecting a received call signal on the display unit, and the controller may set an end point of the call button touching-and-dragging as the output point.

The controller may output a guide message or image to guide the user to recognize the output point.

The controller may set the output point based on the ambient noise collected via a microphone.

The mobile terminal may further comprise a force-touch sensor configured to sense a contact point of the user's ear on the display unit, wherein the controller sets the contact point of the user's ear sensed by the force-touch sensor as the output point.

The mobile terminal may further comprise a frame provided in a rear surface of the vibration receiver, wherein a preset distance is provided between the vibration receiver and the frame.

The vibration receiver may comprise a piezo, and the display unit may comprise a plastic organic light emitting diode (POLED).

The body may comprise a case configured to define an exterior of the mobile terminal; and a middle case mounted in the case, and the display unit may comprise a first region which meets the case or the middle case, and the vibration receiver may be spaced a preset distance from the first region.

The vibration receiver may output a range from 50 Hz to 16 kHz.

Implementations of the present disclosure also provide a control method of a mobile terminal comprising a step for sensing a crack of the display unit; a step for restricting the drive of the vibration receiver and start the drive of the speaker, when a crack of the display is sensed; and a step for driving the vibration receiver, unless the crack of the display is sensed.

The step for driving the vibration receiver may comprise a step for driving only the vibration receiver, when the proximity sensor senses the user's approaching; and a step for driving the vibration receiver and the speaker simultaneously, unless the proximity sensor senses the user's approaching.

The step for driving only the vibration receiver may be operated in a basic setting mode, when no touch is sensed on the display unit, and set the point where touch is sensed as an output point and drives the vibration receiver, when touch is sensed on the display unit.

According to the implementations of the present disclosure, the examples of the mobile terminal in accordance with the present disclosure may use the display unit as the vibration media of the vibration receiver. Accordingly, sound may be transmitted to the front surface of the mobile terminal and the vibration transmitted to the user's hand holding the mobile terminal may be reduced so as to reduce the uncomfortableness caused by the vibration.

Moreover, the vibration receiver and the speaker may be driven selectively or simultaneously. Accordingly, the optimal quality sound may be provided. The vibration receiver is controlled based on the location of the user's ear on the display unit. Accordingly, the optimal quality sound may be provided.

Further scope of applicability of the present invention will become apparent from the detailed description given hereinafter. However, it should be understood that the detailed description and specific examples, while indicating preferred implementations of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3 through 5B are diagrams to describe the arrangement of the vibration receiver provided in the mobile terminal;

DETAILED DESCRIPTION

Figure 1A:
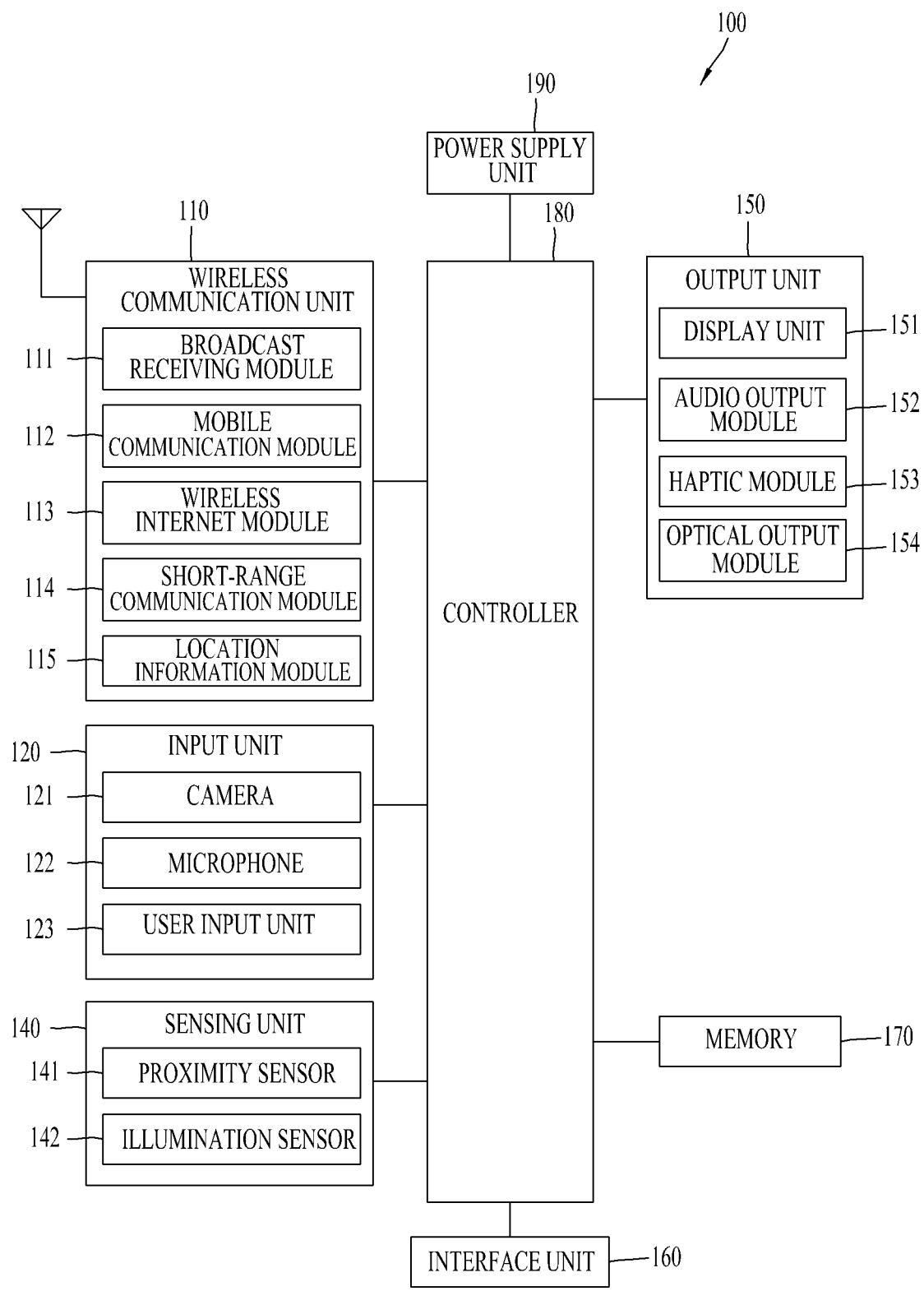
FIG. 1A is a block diagram of a mobile terminal in accordance with the present disclosure.

Description will now be given in detail according to exemplary implementations disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the implementations presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
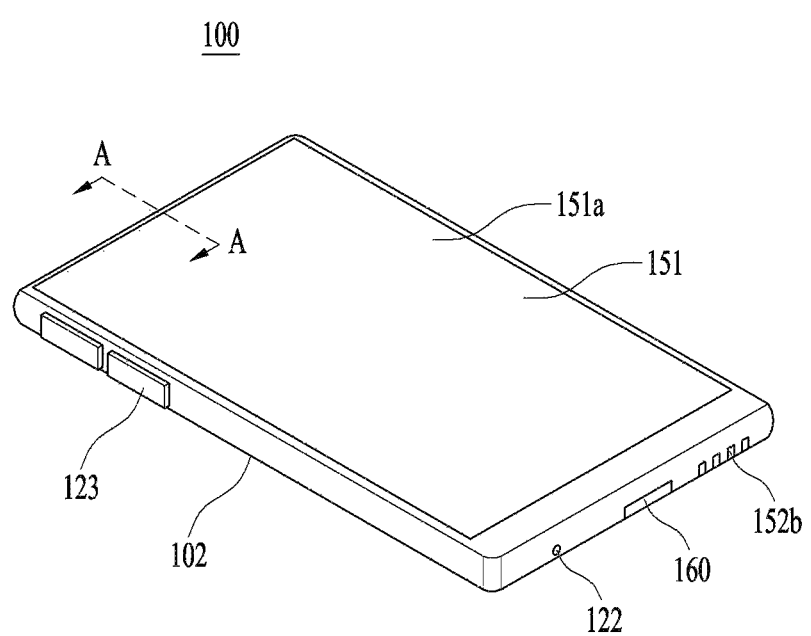
FIGS. 1B and 1C are conceptual views of one example of the mobile terminal, viewed from different directions.
Figure 1C:
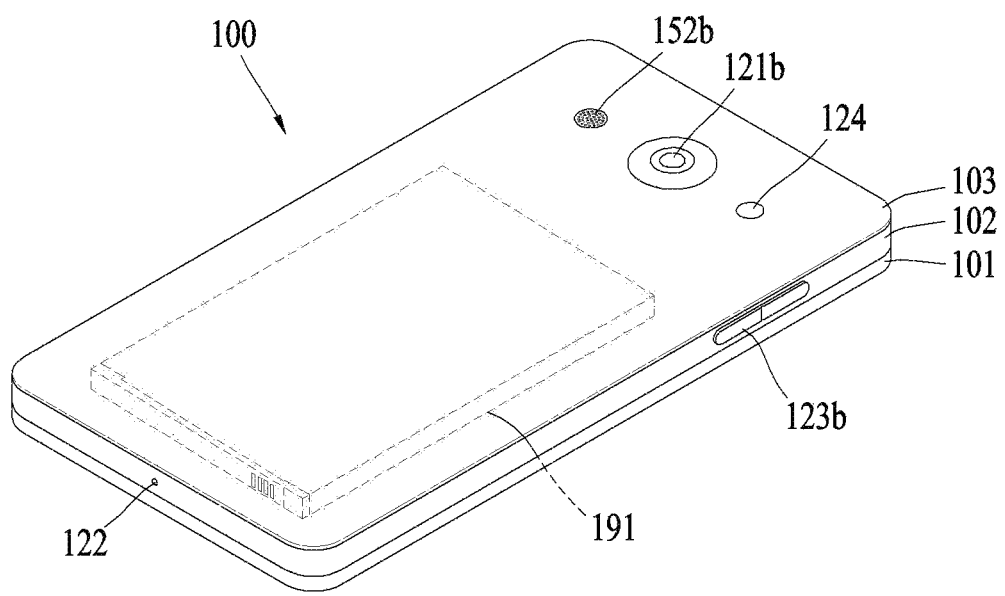

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190.

It is understood that implementing all of the illustrated components in The FIG. 1A is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like.

For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 controls overall operation of the mobile terminal 100, in addition to the operations associated with the application programs.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with implementations of the present disclosure. Also, the operation, control or control method of the mobile terminal may be realized on the mobile terminal by driving of one or more application problems stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some implementations, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some implementations, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some implementations, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some implementations, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

In some implementations, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some implementations, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary implementations disclosed herein.

The power supply unit 190 receives an applied external power and internal power by the control of the controller 180 and supplies a power which is needed in the operations of the components. The power supply unit 190 may include a battery. The battery may be a rechargeable built-in battery and detachably loaded in the terminal body.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various implementations described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some implementations, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some implementations, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

As shown in FIGS. 1B and 1C, a display unit 151 is arranged on a front surface of the terminal body. Typically, a dynamic receiver is arranged in an upper end of the display unit. In the mobile terminal in accordance with the present disclosure, such a dynamic receiver configured to output sounds via a hole formed in an upper portion of the display unit may be omitted to maximize the size of the display unit and reduce the number of holes. Instead of the dynamic receiver, a vibration receiver 152a configured to transmit notes via vibration. The vibration receiver 152a will be described in detail later. Except the vibration receiver, a proximity sensor 141, an illuminance sensor 142, an optical output unit 154, a first camera and a first manipulation unit may be arranged in the front surface or omitted to enlarge the display unit 151 as shown in FIG. 1B.

A second manipulation unit 123b, a microphone 122, a speaker 152b and an interface unit 160 may be arranged in a lateral surface of the terminal body and a second camera 121b may be arranged in the terminal body of the mobile terminal 100 as one example.

Such arrangement of the structure having the components is not limited thereto. The components may be omitted or replaced if necessary or arranged in other surfaces. For example, the first manipulation unit may be provided in a front surface of the terminal body and a speaker 152b may be provided in a rear surface of the terminal body, not the lateral surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

Input received at the first and second manipulation units may be used in various ways. For example, the first manipulation unit may be used by the user to provide an input to a menu, home key, cancel, search, or the like, and the second manipulation unit 123b may be used by the user to provide an input to control a volume level being output from the vibration receiver 152a or the speaker 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the vibration receiver 152a or the speaker 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Implementations that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the speaker 152b can be located on the terminal body. The speaker 152b may implement stereophonic sound functions in conjunction with the vibration receiver 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen Further preferred implementations will be described in more detail with reference to additional drawing figures. It is understood by those skilled in the art that the present features can be embodied in several forms without departing from the characteristics thereof.

Figure 2:
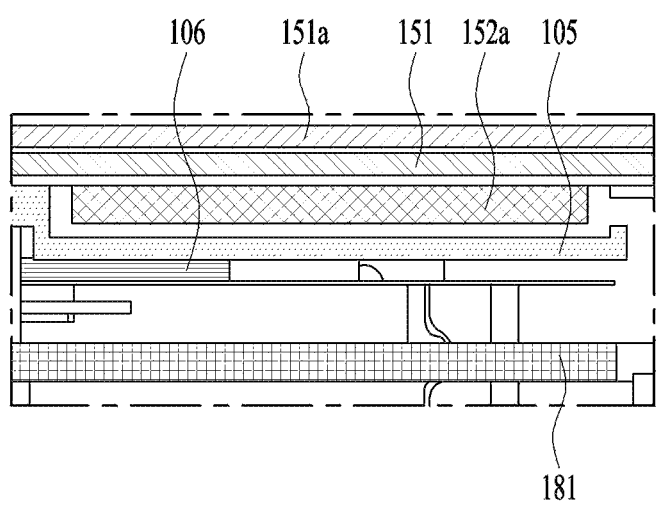
FIG. 2 is a diagram illustrating a vibration receiver provided in the mobile terminal.

FIG. 2 is a diagram illustrating the vibration receiver 152a provided in the mobile terminal. FIGS. 3 through 5B are diagrams to describe the arrangement of the vibration receiver 152a provided in the mobile terminal 100.

The mobile terminal 100 uses the vibration receiver 152a configured to transmit sounds via vibration, instead of the dynamic receiver configured to transfer sounds via air. The vibration receiver 152a includes a piezo configured to convert a an electric signal into vibration or generate the physical deformation of an electrical signal. When a signal is applied to the piezo, the piezo generates vibration according to the applied signal and a medium for transmitting the vibration needs to be provided t to amplify the vibration generated by the piezo.

As the vibration transmission medium, a middle frame 105 may be arranged in the case 101 and 102 or the mobile terminal and support the display unit 151. The middle frame 105 includes metal and at least part of the display unit contact with the middle frame. The user habitually tends to put the ear on the front surface of the mobile terminal, because of the habit of talking on the mobile terminal via the conventional receiver located in the front surface. When vibrating the frame 105 or the case 101 and 102, the vibration transmission might weak and the user might feel uncomfortable in the hand holding the body of the mobile terminal 100.

To solve such disadvantage, the vibration receiver 152a shown in FIG. 2 is attached to the rear surface of the display unit 151. The conventional display unit 151 is thick or hard so that it might damage in case of using the vibration receiver 152a. Recently, a flexible and slim display unit 151 is released such as plastic organic light emit diode (POLED) so that it can be used as the sound transmission media of the vibration receiver 152a.

As shown in FIG. 2, the vibration receiver 152a is arranged in the rear surface of the display unit 151 and the vibration of the vibration receiver 152a has to be transmitted to the display unit, not to the other components. For that, the vibration receiver 152a may be spaced a preset distance from a middle frame 105 arranged in the rear surface of the display unit 151.

When the user puts the display unit near the ear, the vibration of the display unit 151 functions as a speaker diaphragm and generates vibration of air to transmit sound. When the user puts the display unit 151 in close contact with the ear, the vibration is directly transmitted via the user's bone and then functions as a bone conduction speaker. In other words, the vibration receiver 152a may transmit sounds not only via air but also via bone conduction.

Figure 3:
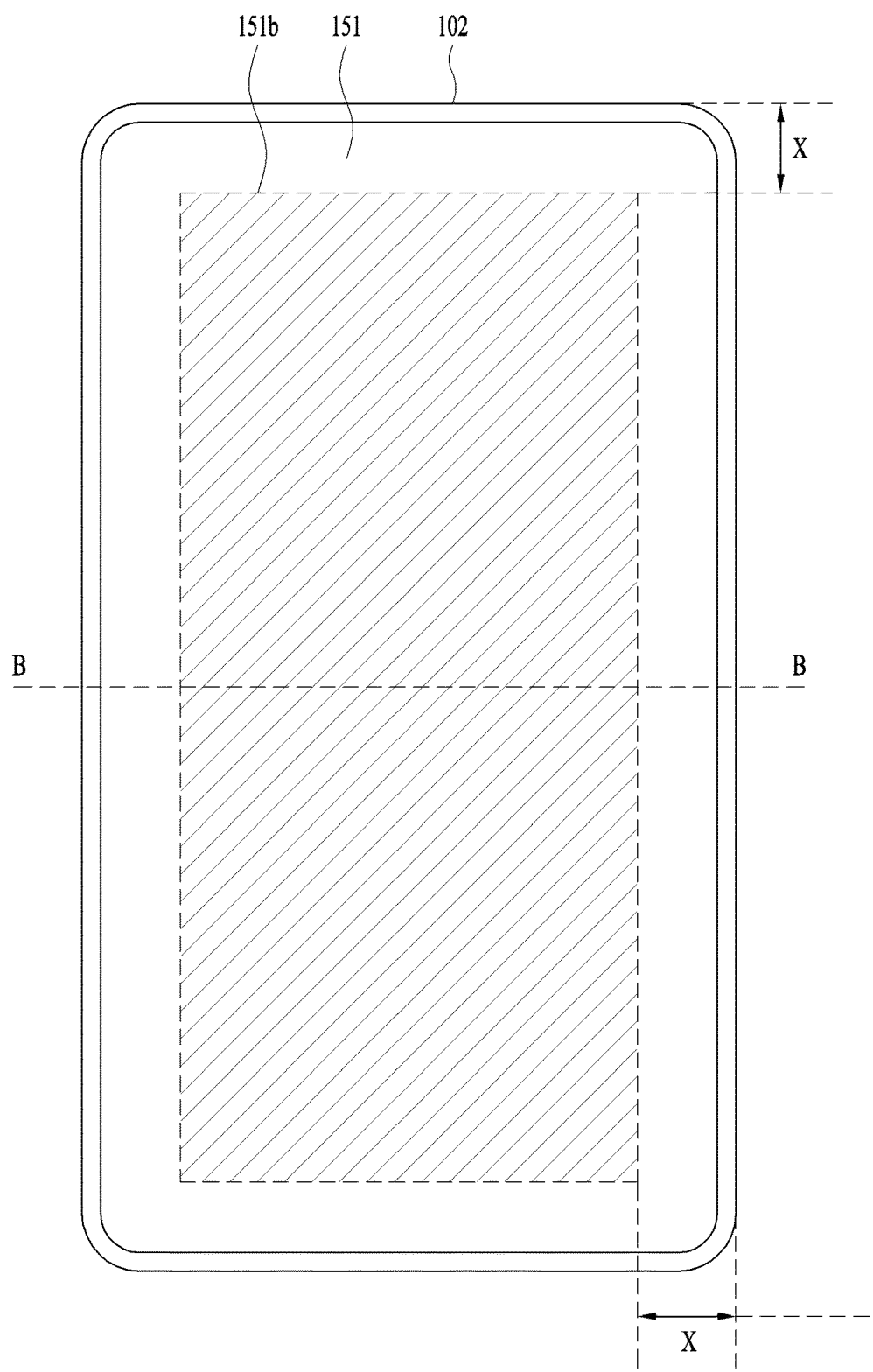
Figure 4:
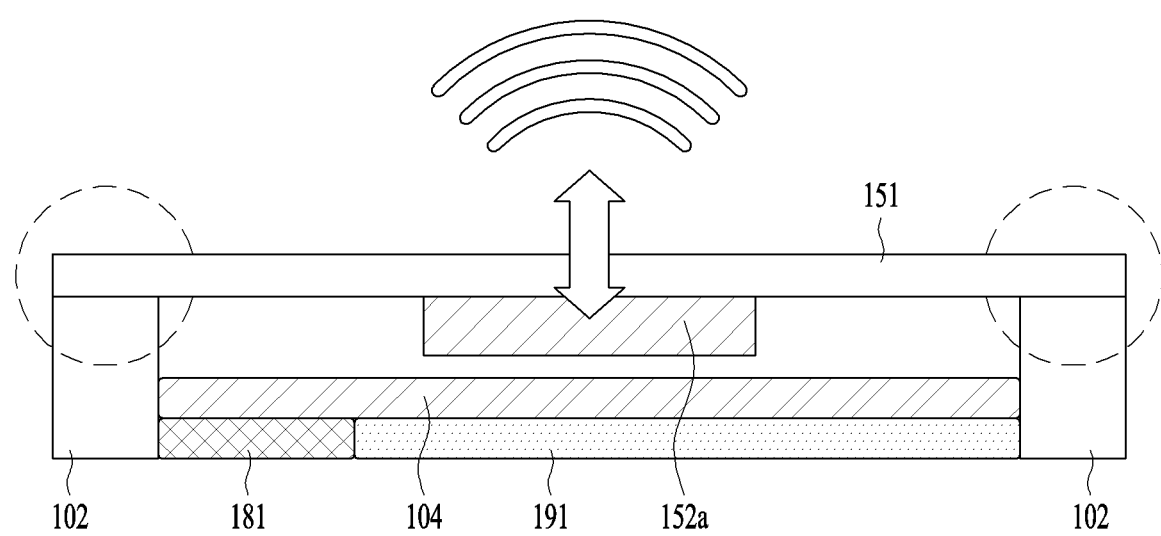

FIGS. 3 and 4 are diagrams to describe the location of the vibration receiver 152a on the display unit 151 of the mobile terminal 100. The vibration receiver is configured to transmit sound by vibrating the display unit 151 so that it may be attached to a location 151b where the display unit 151 is able to vibrate sufficiently.

FIG. 4 is a sectional diagram of FIG. 3 along B-B'. Both ends of the display unit 151 are supported to the case 102. If the vibration receiver 152a is located adjacent to a region connectedly meet the case 102, the vibration of the display unit 151 might be insufficient. The other region may meet the case 102, except the region where the display unit 151 is supported, or the middle frame 105 rather than the case 102.

Accordingly, the vibration receiver 152a has to be embedded in a region 151b which is spaced a preset distance (for example, 10 mm) from the region of the display unit 151 which meets the case 102 or middle case 105, so that the display unit may be vibrated enough to transmit sound.

Figures 5A, 5B:
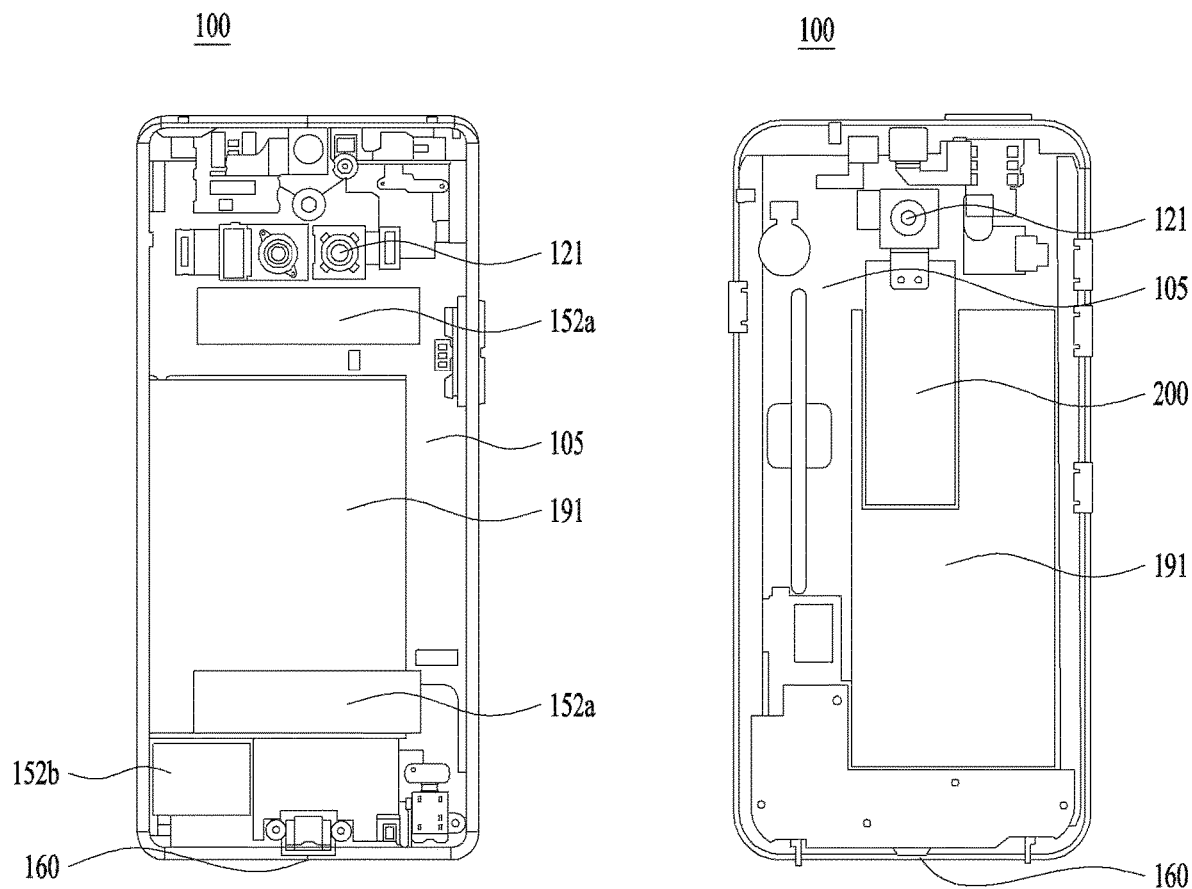

FIGS. 5A and 5B are diagrams showing a front view of the mobile terminal 100, without the display unit 151. The vibration receiver 152a may be arranged horizontally as shown in FIG. 5A or vertically as shown in FIG. 5B.

The vibration pattern transmitted to the display unit 151 may be variable according to the arrangement direction of the vibration receiver 152a. Considering the arrangement of the components, the arrangement of the vibration receiver 152a may be determined. As shown in FIG. 5A, vibration receivers 152a may be provided in upper and lower regions, respectively, and controlled independently to provide two-channel sounds.

Figure 6A:
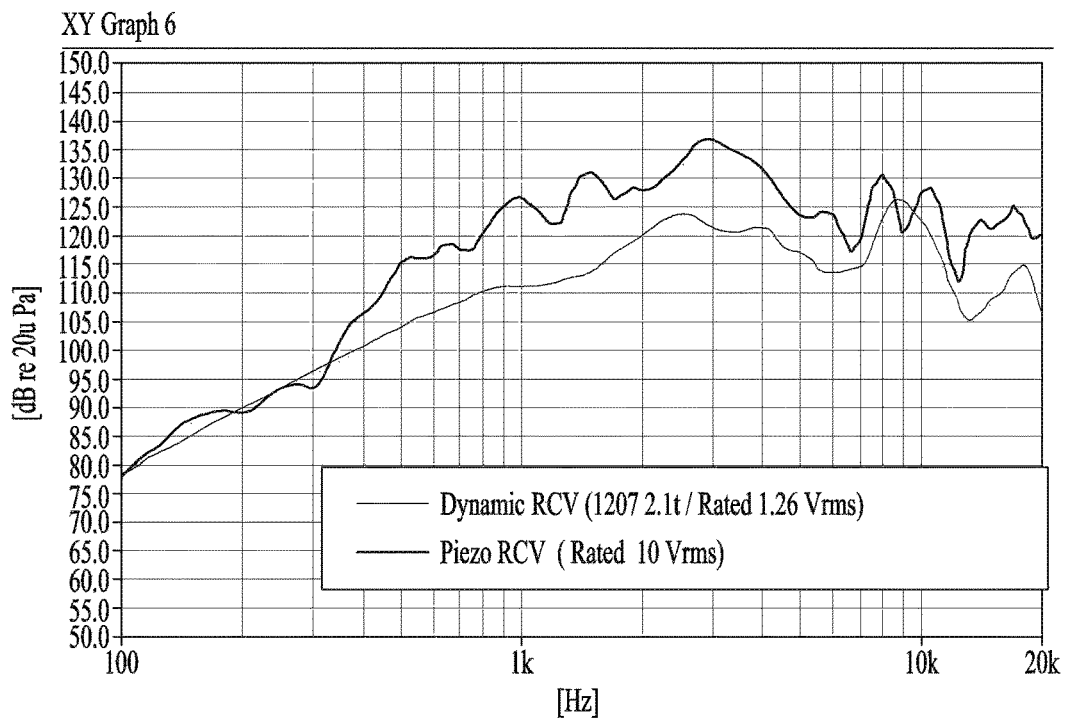
FIG. 6A and 6B include a graph to compare performance of the vibration receiver provided in the mobile terminal and performance of a conventional dynamic receiver and a graph illustrating performance in case the vibration receiver is tuned.
Figure 6B:
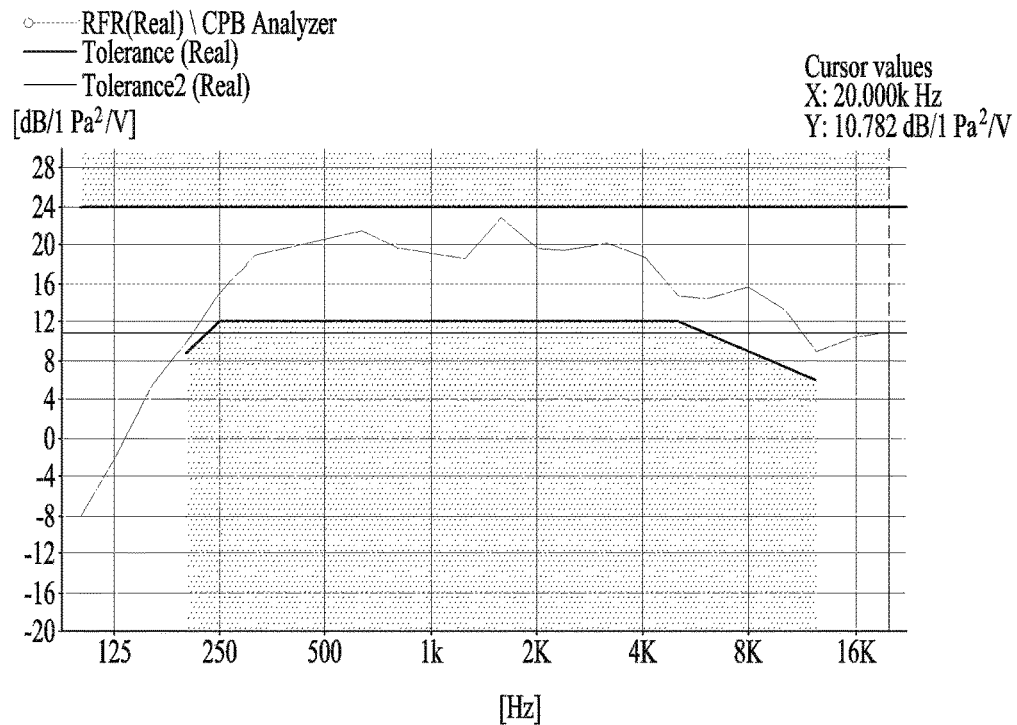

FIG. 6A and 6B illustrate graphs showing a comparison between the performance of the vibration receiver in accordance with the present disclosure and that of the conventional dynamic receiver and a graph showing the performance of the vibration receiver having a tuned output.

FIG. 6A is a graph showing comparison between the performances of the vibration receiver 152a provided in the mobile terminal 100 in accordance with the present disclosure and the conventional dynamic receiver. Y-axis refers to the size (dB) of sound and X-axis refers to the frequency (Hz) of the output sound. The receivers have similar performances in a low frequency band (or low sounds). The vibration receiver 152a in accordance with the present disclosure has a better performance in middle and high frequency bands (high sounds).

When the output sound of the vibration receiver 152a is tuned, the performance shown in FIG. 6B is gained. In this instance, a range for outputting reference-size volume can be expanded enough to gain a super wide band radio frequency radiation. In other words, the vibration receiver 152a is capable of outputting sounds in a range from 50 Hz to 16 kHz and has better play characteristics of a high frequency band than the conventional dynamic receiver.

Figure 7:
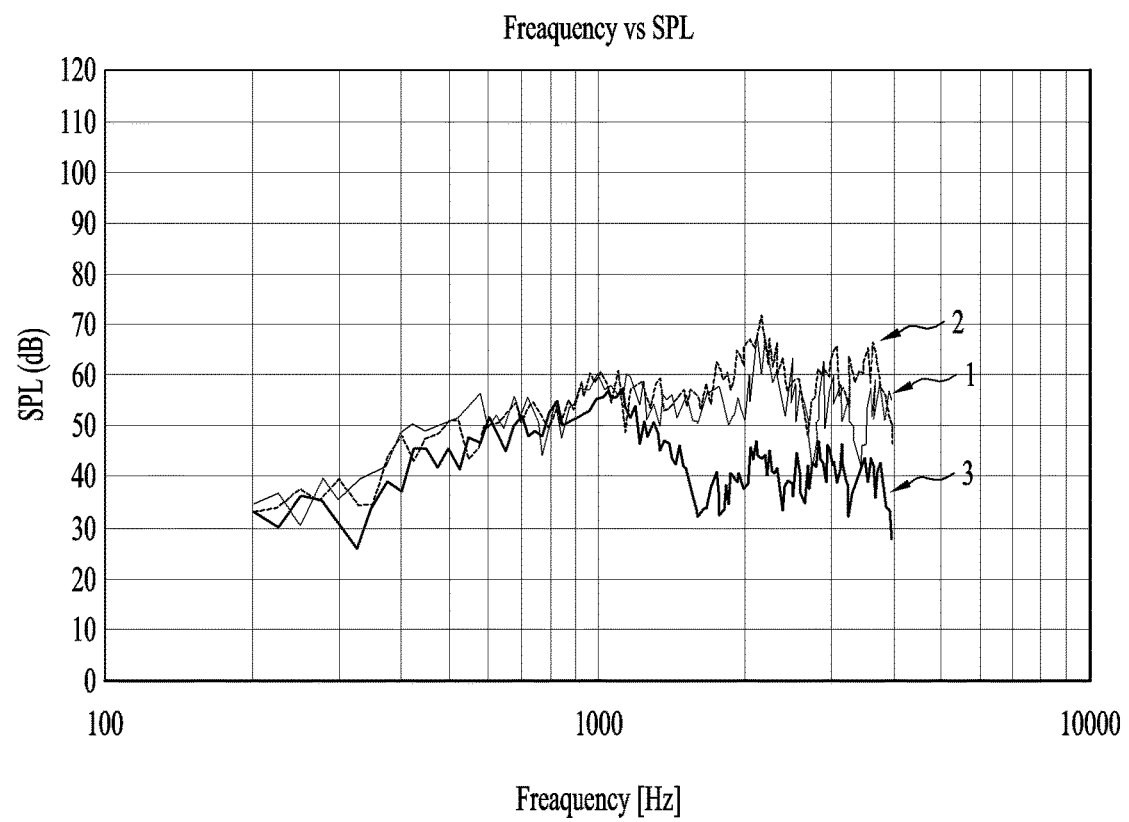
FIG. 7 includes a graph and a diagram to describe characteristics of frequencies according to the location of the display unit of the mobile terminal and the location of the user's ear.
Figure 7:
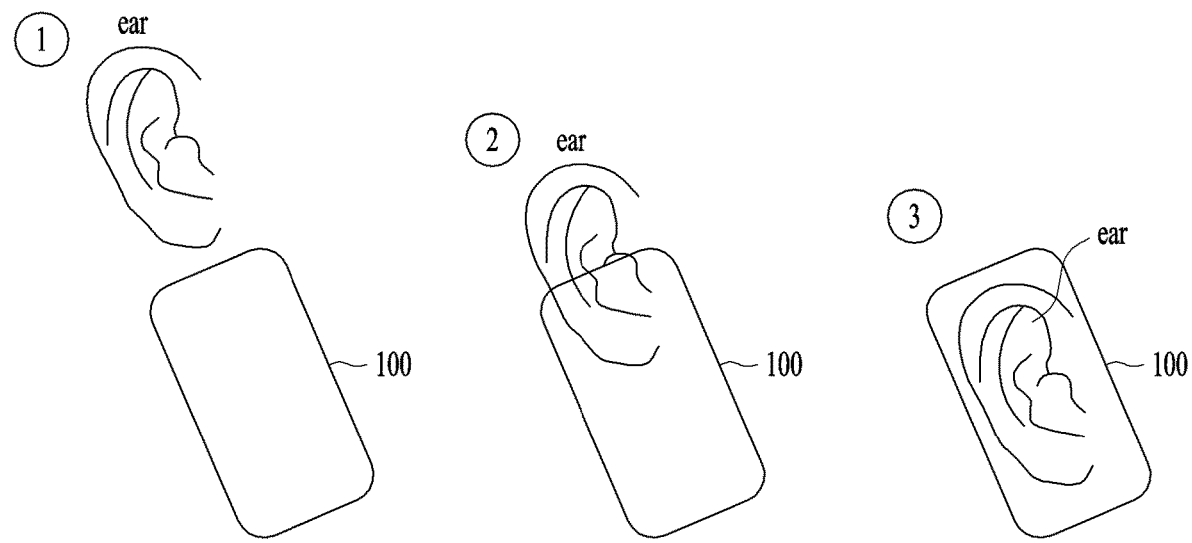

FIG. 7 includes a graph and a diagram to describe characteristics of frequencies according to the location of the display unit 151 of the mobile terminal 100 and the location of the user's ear. The frequency characteristics have each different pattern when the user hears the sound generated by the vibration of the display unit 151 in a state where he or she puts the ear near the mobile terminal 100, not directly contacting with the ear, as shown in ① or in a state where he/she puts the ear on an upper end of the mobile terminal as shown in ② or in a state where he/she puts the overall area of the ear on the display unit 151. More specifically, not only the size but also the quality of the sound transmitted to the user may be varied according to the relative location of the user's ear with the mobile terminal 100.

Figure 8A:
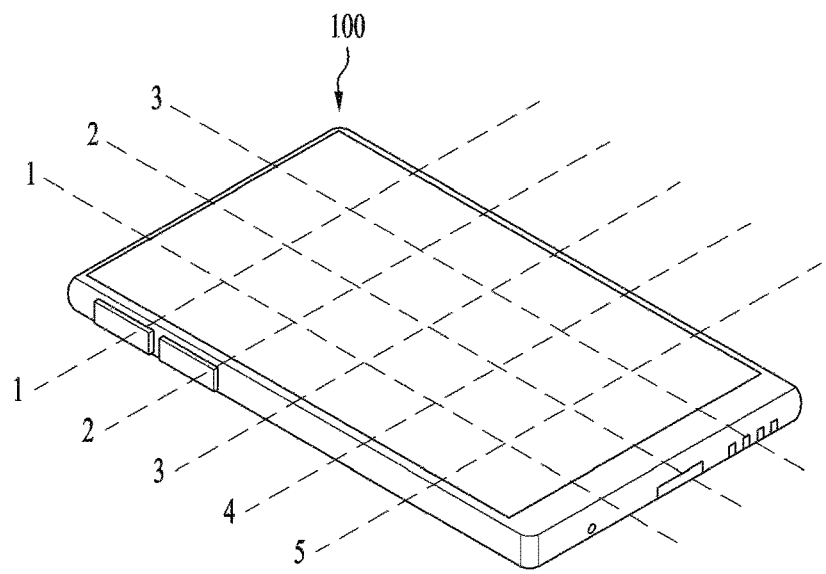
FIG. 8A and 8B include a diagram and a graph to describe a sound pressure level for each point of the display unit provided in the mobile terminal.
Figure 8B:
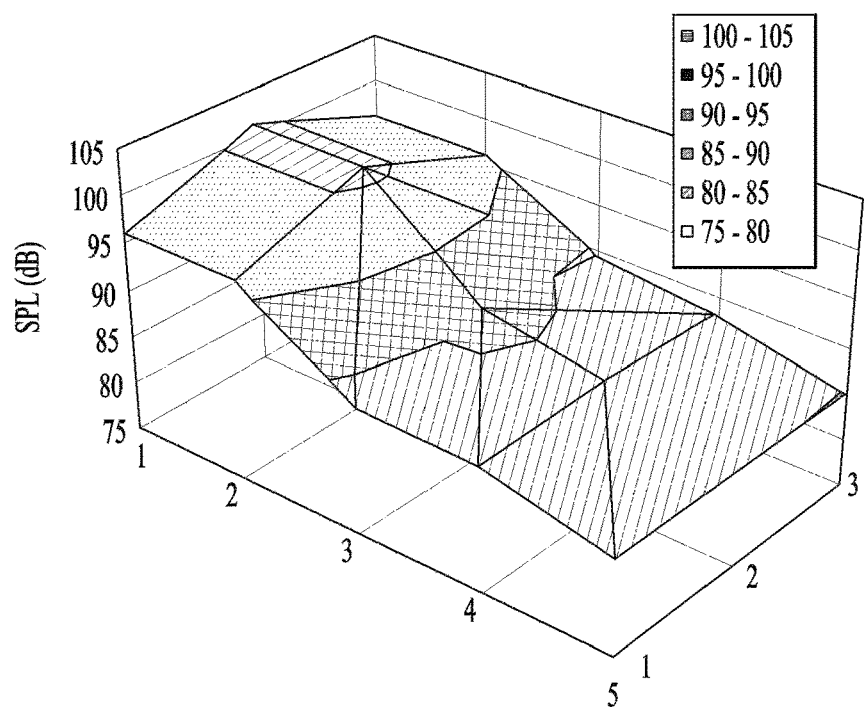

FIGS. 8A and 8B illustrate a diagram and a graph to describe a sound pressure level (SPL) of each point of a plurality of points on the display unit 151 provided in the mobile terminal 100. As shown in FIG. 8A, one surface of the display unit 151 is divided by using grid to set divided points. As shown in FIG. 8B, each point has a different sound pressure level (SPL) according to a relative location with the vibration receiver 152a.

The SPLs for the points of the display unit 151 are differentiated, respectively, according to the distances with the vibration receiver 152a and also according to the thickness and flexible degree of the display unit 151. Data about the SPL for each point of the display unit is stored in the memory provided in the mobile terminal 100 in accordance with the present disclosure and the vibration of the vibration receiver 152a may be controlled based on the SPL data for the point(s) where the user's ear is located, so as to provide optimal sounds, regardless of the user's ear locations.

The size and quality of the sound the user feels may be varied according to the distance between the display unit 151 and the user's ear and a contact degree between the user's ear and the display unit 151. Accordingly, the optimal sound may be provided by controlling the vibration receiver 152a according to the location of the user's ear sensed by the proximity sensor 141 or a force-touch sensor.

Figure 9A:
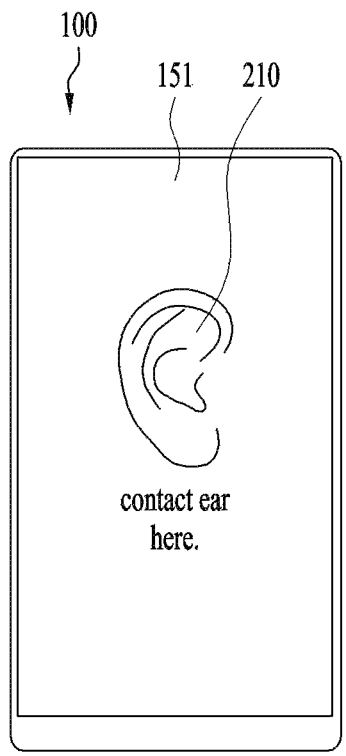
FIG. 9A and 9B are diagrams illustrating a method for guiding a user to a location to put the ear or specifying the location where the user will put the ear for the optimal performance of the vibration receiver provided in the mobile terminal.
Figure 9B:
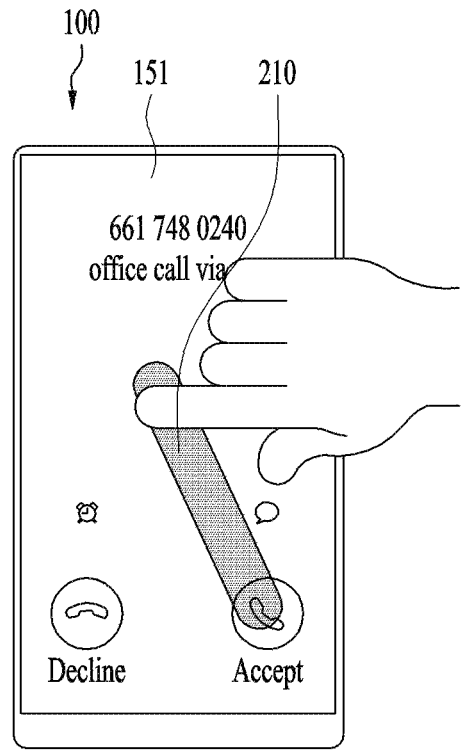

FIGS. 9A and 9B area diagrams illustrating a method for guiding a user to a location to put the ear or specifying the location where the user will put the ear for the optimal performance of the vibration receiver 152a provided in the mobile terminal 100.

In some implementations, as shown in FIG. 9A, a Graphical User Interface (UI) 210 configured to guide the user to put the ear on an output point to which the optimal quality sound can be provided (hereinafter, a hot spot) may be output on the display unit 151. The hot spot may be variable according to ambient noise or characteristics of the output sound. For example, in case of no ambient noise, the user is guided to put the ear on an output point having the highest SPL to enhance sound transmission efficiency. In case of much ambient noise, the user is guided to put the ear in close contact with a central region of the display unit 151.

In some other implementations, as shown in FIG. 9B, the user can set the hot spot. For example, when dragging a call button, the end point of the dragging is set as the hot spot and the controller 180 may control the vibration of the vibration receiver 152a based on SPL of the dragging end point stored in the memory.

Figure 10:
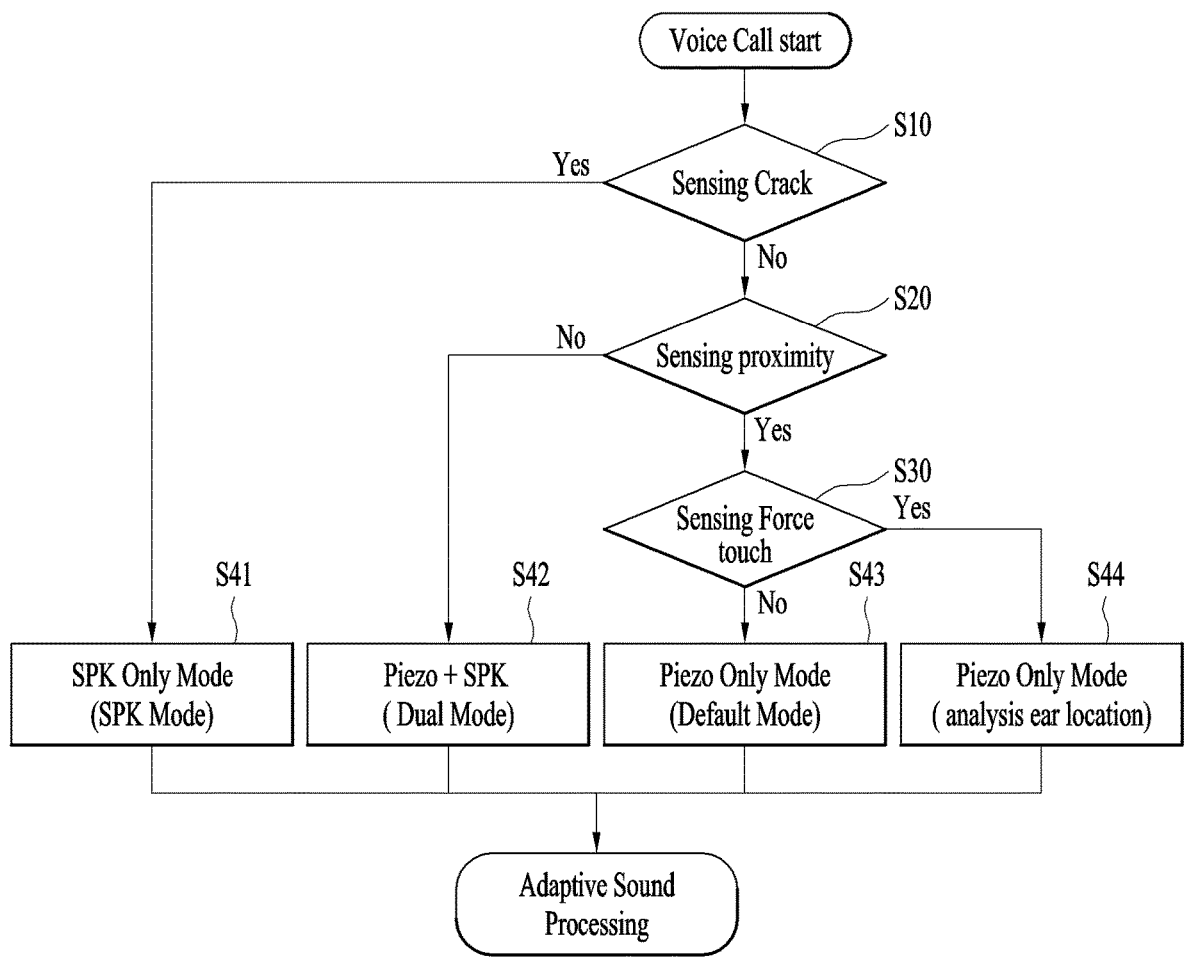
FIG. 10 is a diagram illustrating a method for controlling the drive of the vibration receiver and a speaker which are provided in the mobile terminal.

FIG. 10 is a diagram illustrating a method for controlling the drive of the vibration receiver 152a and a speaker 152b which are provided in the mobile terminal 100. The mobile terminal 100 in accordance with the present disclosure may further include a speaker 152b rather than the vibration receiver 152a. The speaker 152b provides sound with a higher output than the vibration receiver 152a, so that the user can hear sound even in a distant location from the display unit.

The controller 180 selectively or simultaneously drives the speaker 152b and the vibration receiver 152a so as to provide the optimal sound quality and volume to the user.

The vibration receiver 152a is configured to vibrate the display unit 151. When a crack occurs in the display unit 151, the vibration of the vibration receiver 152a might fail to be transmitted properly and such a crack might become worse. Accordingly, before driving the vibration receiver 152a, presence of a crack on the display unit 151 has to be determined. If there is a crack, the drive of the vibration receiver 152a is limited and a speaker mode configured to output sound only via the speaker 152b is controlled to drive (S41).

The display unit 151 includes a plurality of pixels and a signal is transmitted along a plurality of electrodes aligned in the pixels in a grid pattern to drive the pixels. When the crack occurs, the controller senses an error in transmitting a signal to the electrodes and determines the presence of the crack based on the result of the sensing. Even when a crack occurs on a window 151a located on a front surface of the display unit the display unit 151, the vibration receiver 152a might become the crack worse. In this instance, the speaker mode configured to drive only the speaker 152b is driven. A touch sensor for sensing a touch signal on the window 151a may be formed. When an error is sensed in the touch sensor, the presence of the crack on the window 151a may be determined.

Unless sensing the crack, the proximity sensor senses whether the user's ear approaches near the front surface of the mobile terminal 100 (S20). When the user's ear is not arranged near the front surface, the speaker 152b and the vibration receiver 152a may be controller to be driven in a dual mode configured to drive them at the same time (S42).

Figure 11:
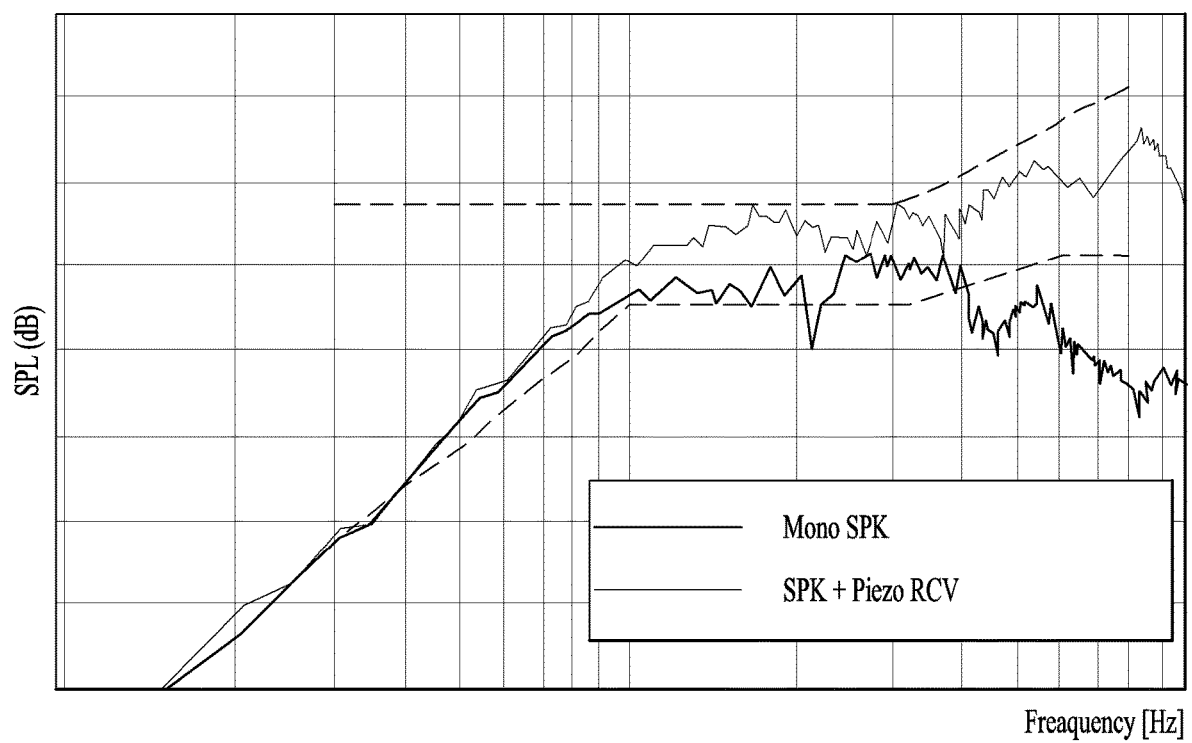
FIG. 11 is a diagram to describe characteristics of a frequency when the vibration receiver and the speaker are driven.

FIG. 11 is a diagram to describe characteristics of a frequency when the vibration receiver 152a and the speaker 152b of the mobile terminal 100 are driven. A small-sized speaker 152b embedded in the mobile terminal 100 as shown in FIG. 11 has a low sound quality in the high frequency band and a disadvantage of a divided high sound in the high frequency band. The vibration receiver 152a has an advantage of a high quality sound by compensating the defect of the speaker 152b. Accordingly, both the speaker 152b and the vibration receiver 152a are driven simultaneously.

When the proximity sensor senses that the user's ear approaches near the display unit 151, sound may be output by using only the vibration receiver 152a (S43, S44). The touch sensor may senses whether the user touches the display unit 151 so as to provide a high quality sound (S30). When the user is not in close or complete contact with the display unit 151, it is difficult to determine the location of the user's ear precisely. In this instance, the vibration receiver 152a is driven to provide a predetermined quality sound set as a basic value (S43).

However, when it is sensed that the user's ear is in close contact with the display unit 151, the location of the user's ear on the display unit 151 may be determined and the drive of the vibration receiver 152a may be controlled to set the determined location of the user's ear as the hot spot (S44). By extension, a force-touch sensor may sense not only the touch of the user's ear with the display unit 151 but also the close contact of the user's ear with the display unit. When it is determined that the ear is in close contact with the display unit 151, the vibration receiver may transmit the sound like the bone conduction speaker 152b. The vibration receiver 152a may be controlled to be driven from the sound transmission method via vibration into air to the direct sound transmission method to the user's bone.

As mentioned above, the display unit 151 may be used as the vibration media of the vibration receiver 152a. Accordingly, sound may be transmitted to the front surface of the mobile terminal 100 and the vibration transmitted to the user's hand holding the mobile terminal 100 may be reduced so as to reduce the uncomfortableness caused by the vibration.

Moreover, the vibration receiver 152a and the speaker 152b may be driven selectively or simultaneously. Accordingly, the optimal quality sound may be provided. The vibration receiver 152a is controlled based on the location of the user's ear on the display unit 151. Accordingly, the optimal quality sound may be provided.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
a body;
a display unit that is coupled to a first surface of the body and that includes an elastic material;
a vibration receiver that is coupled to a second surface of the display unit and that is configured to vibrate the display unit to generate sound having a first output and travelling up to a first distance;
a speaker that is configured to generate sound having a second output and travelling up to a second distance, wherein the second output is higher than the first output and the second distance is larger than the first distance; and
a controller that is configured to:
determine whether a crack is generated on a display unit or a portion of a first surface of the display unit,
based on a determination that a crack is generated on the display unit or the portion of the first surface of the display unit, drive, based on one or more audio signals, the speaker without driving the vibration receiver, and
based on a determination that a crack is not generated on the display unit or the portion of the first surface of the display unit and the one or more audio signals, (i) drive the vibration receiver to vibrate the display unit or (ii) drive the speaker.

2. The mobile terminal of claim 1, wherein the portion of the first surface of the display unit comprises a touch sensor, and
wherein the controller is configured to determine an error of the touch sensor as the crack being generated on the portion of the first surface of the display unit.

3. The mobile terminal of claim 1, wherein the display unit further comprises a proximity sensor, and
wherein the controller is configured to:
determine whether an object approaches to the mobile terminal using the proximity sensor,
based on a determination that an object approaches to the mobile terminal, drive the vibration receiver without driving the speaker, and
based on a determination that an object does not approach to the mobile terminal, drive the vibration receiver and the speaker simultaneously.

4. The mobile terminal of claim 1, further comprising:
one or more additional vibration receivers,
wherein the one or more audio signals include multiple channel audio signals, and
wherein the controller is configured to, based on the multiple channel audio signals, control the vibration receiver and the one or more additional vibration receivers to generate stereo sound.

5. The mobile terminal of claim 1, further comprising:
a memory that stores a plurality of sound pressure level that are respectively associated with a plurality of points on the display unit,
wherein the controller is configured to:
determine a first point of the plurality of points as an output point, and
drive the vibration receiver based on the sound pressure level associated with the output point.

6. The mobile terminal of claim 5, wherein the controller is configured to:
output, at a second point of the plurality of points on the display unit, a graphical user interface,
receive, through a touch sensor of the mobile terminal, touch-and-drag input from a user of the mobile terminal, the touch-and-drag input beginning at the second point of the plurality of points and ending at a third point of the plurality of points, and
determine the third point as the output point.

7. The mobile terminal of claim 5, wherein the controller is configured to:
output, at the output point on the display unit, a guide message or a guide image to guide the output point to a user of the mobile terminal.

8. The mobile terminal of claim 5, wherein the controller is configured to:
obtain ambient noise adjacent to the mobile terminal using a microphone of the mobile terminal, and
determine the output point based on ambient noise.

9. The mobile terminal of claim 5, further comprising:
a force-touch sensor that is configured to sense touch input, from a user, that is received at a particular point of the plurality of points on the display unit,
wherein the controller is configured to determine the particular point as the output point.

10. The mobile terminal of claim 1, further comprising:
a middle frame that is located adjacent to a first surface of the vibration receiver and that is spaced from the vibration receiver.

11. The mobile terminal of claim 1, wherein the vibration receiver comprises a piezo that is configured to generate vibration based on the one or more audio signals.

12. The mobile terminal of claim 1, the display unit comprises a plastic organic light emitting diode (POLED).

13. The mobile terminal of claim 1, further comprising:
a case that defines an exterior of the body; and
a middle frame that is mounted in the body and that is configured to support a first portion of the second surface of the display unit,
wherein the vibration receiver is coupled to a second portion of the second surface of the display unit, the second portion being spaced from the first portion of the second surface of the display unit.

14. The mobile terminal of claim 1, wherein the vibration receiver is configured to vibrate the display unit to generate sound having a frequency range between 50 Hz and 16 kHz.

15. The mobile terminal of claim 13, wherein the middle frame is located inside of a space defined by the case.

16. A method for controlling a mobile terminal, the method comprising:
determining whether a touch input is received at a touch sensor of a display unit of the mobile terminal;
based on a determination that the touch input is received at the touch sensor of the display unit, driving a speaker of the mobile terminal without driving a vibration receiver of the mobile terminal; and
based on a determination that the touch input is not received at the touch sensor of the display unit, driving the vibration receiver to vibrate the display unit.

17. The method of claim 16, wherein driving the vibration receiver comprises,
determining whether an object approaches to the mobile terminal using a proximity sensor, and
based on a determination that an object approaches to the mobile terminal, driving the vibration receiver without driving the speaker, and
based on a determination that an object does not approach to the mobile terminal, driving the vibration receiver and the speaker simultaneously.

18. The method of claim 16, wherein driving the vibration receiver comprises:

determining a first point of a plurality of points on the display unit as an output point, the first point being a point to which touch input is applied.

\* \* \* \* \*